United States Patent [19]

Handtmann

[11] Patent Number: 5,453,184
[45] Date of Patent: Sep. 26, 1995

[54] FILTER CARRIER

[76] Inventor: Thomas Handtmann, Hugo-Häring-Strasse 60, Biberach, Germany

[21] Appl. No.: 210,034

[22] Filed: Mar. 16, 1994

[30] Foreign Application Priority Data

Mar. 23, 1993 [DE] Germany .................... 43 09 366.3

[51] Int. Cl.$^6$ .................... B01D 37/02; B01D 25/164; B01D 25/12
[52] U.S. Cl. .................... 210/193; 210/227; 210/229; 210/230; 210/231; 210/344; 210/323.1; 210/450
[58] Field of Search .................... 210/193, 777, 210/778, 450, 489, 224, 227, 228, 229, 230, 231, 284, 323.1, 344; 100/197, 199, 200, 206

[56] References Cited

U.S. PATENT DOCUMENTS

| | | |
|---|---|---|
| 3,884,805 | 5/1975 | Bagdasurian . |
| 4,066,546 | 1/1978 | Sasaki . |
| 4,201,670 | 5/1980 | Baur . |
| 4,222,873 | 9/1980 | Parsons . |
| 4,277,337 | 7/1981 | Zdansky . |
| 4,282,261 | 8/1981 | Greene . |
| 4,285,821 | 8/1981 | Hiesinger . |
| 4,288,462 | 9/1981 | Hou . |
| 4,297,211 | 10/1981 | Hiesinger . |
| 4,333,839 | 6/1982 | Cardoza . |
| 4,367,150 | 1/1983 | Hiesinger . |
| 4,379,051 | 4/1983 | Hiesinger . |
| 4,427,554 | 1/1984 | Busse . |
| 4,514,306 | 4/1985 | Pato . |
| 4,643,827 | 2/1987 | Becker . |
| 4,655,919 | 4/1987 | Schafft . |
| 4,925,570 | 5/1990 | Schafft . |
| 5,045,199 | 9/1991 | Fast . |
| 5,069,791 | 12/1991 | Becker . |
| 5,300,234 | 4/1994 | Oechsie . |

FOREIGN PATENT DOCUMENTS

| | | |
|---|---|---|
| 31522 | 7/1981 | European Pat. Off. . |
| 325188 | 7/1989 | European Pat. Off. . |
| 2479703 | 10/1981 | France . |
| 2004613 | 2/1969 | Germany . |
| 2207459 | 8/1973 | Germany . |
| 2327935 | 1/1975 | Germany . |
| 2434343 | 1/1976 | Germany . |
| 2627725 | 1/1977 | Germany . |
| 2631395 | 1/1978 | Germany . |
| 43 09 366.3 | 2/1989 | Germany . |
| 4127477 | 2/1993 | Germany . |
| 54-58270 | 5/1979 | Japan . |
| 2-277519 | 11/1990 | Japan . |
| 505898 | 5/1971 | Switzerland . |
| 1351596 | 5/1974 | United Kingdom . |
| 2195262 | 4/1988 | United Kingdom . |
| WO93/00146 | 1/1993 | WIPO . |

OTHER PUBLICATIONS

"Niagara Filters—for the Chemical, Food, Fermentation and Process Industries"—copyright 1947—14 pages.
"Diatomite—Filtration of Potable Waters" copyright 1955 Great Lakes Carbon Corp.

*Primary Examiner*—Thomas M. Lithgow
*Attorney, Agent, or Firm*—Tilton, Fallon, Lungmus & Chestnut

[57] ABSTRACT

The present invention relates to a filter carrier 1 for the construction of a filter tower 9. To simplify the construction on the whole, the invention provides for a seal which is arranged on the pressure-exerting plate of the filter carrier and comprises a sealing edge for sealing between the pressure-exerting plate and. the side wall of a filter carrier positioned thereunder, as well as a sealing collar for sealing and retaining the distributor element on the pressure-exerting plate.

12 Claims, 2 Drawing Sheets

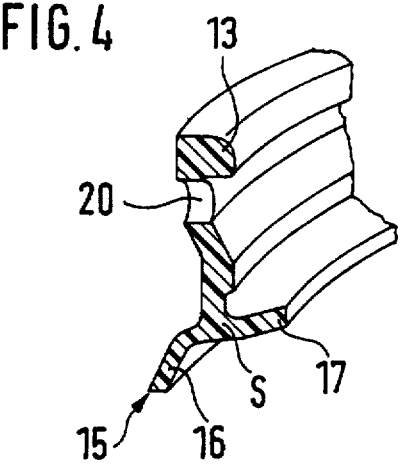
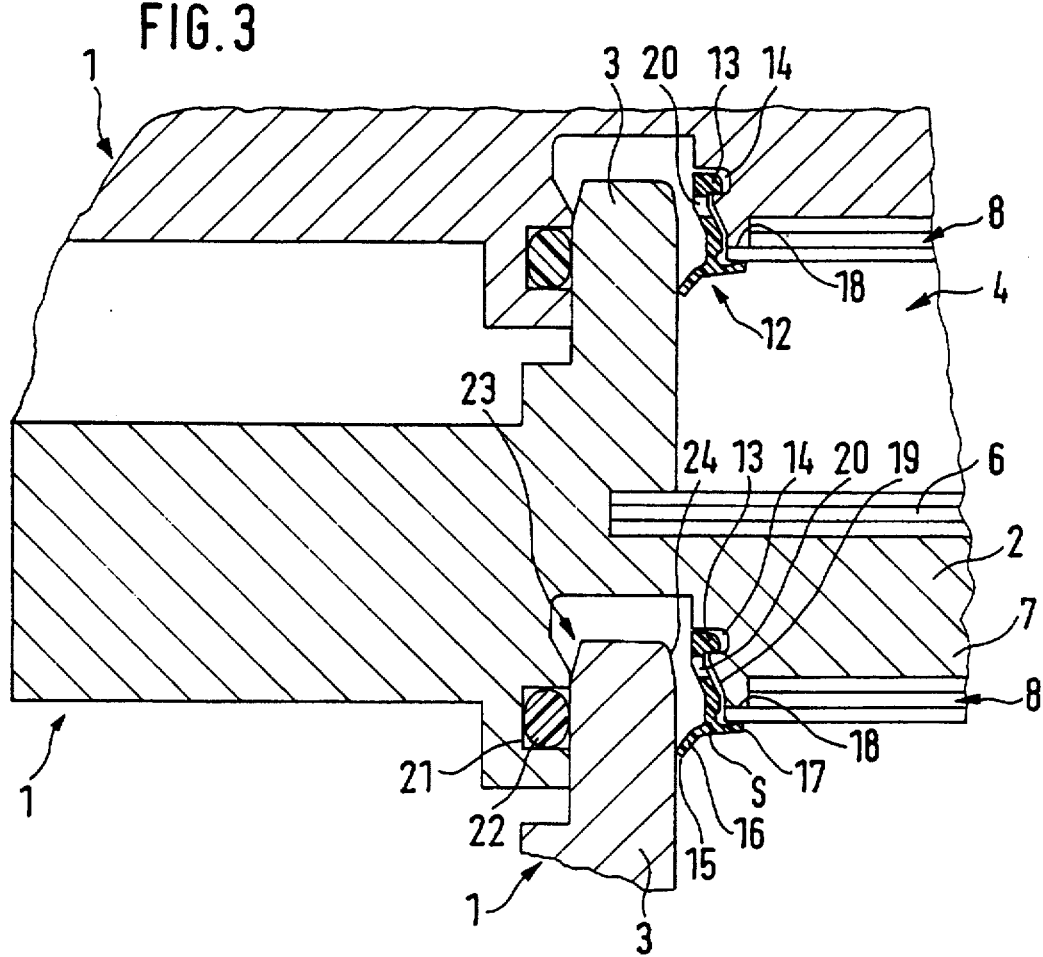

FILTER CARRIER

BACKGROUND AND SUMMARY

The present invention relates to a filter carrier to be stacked for obtaining a filter tower, said filter carrier comprising a filter chamber defined by a bottom and a side wall for receiving a filter cake, a pressure-exerting plate which is formed on the bottom and which, when a plurality of filter carriers are superposed, engages at least partly into the filter chamber positioned thereunder for pressing the filter cake formed therein, at least one distributor element positioned below the pressure-exerting plate for distributing liquid to be filtered, and a seal for sealing between the pressure-exerting plate and the side wall of the filter carrier positioned thereunder.

Such a filter carrier is already known from PCT EP 92/01436, which originates from the same applicant. Filter carriers of this type are used for building a filter tower which may especially be used for sterile filtration in the beverage industry. When beer is being filtered, yeast cells and bacteria can be held back without preventing fine substances, which are responsible for the taste, from flowing therethrough.

The filter aid is supplied for precoating in a precoating station onto the filter carriers. The filter carriers are then superposed, thereby forming said filter tower.

The liquid to be filtered is then introduced laterally into the superposed filter chambers. To achieve a uniform distribution of the liquid to be filtered over the surface of the filter aid, a distributor element is arranged on the bottom of each filter carrier.

When the filter carriers are arranged one on top of the other, the bottom which is provided with a pressure-exerting plate and pertains to a filter carrier positioned thereabove engages in the manner of a pressure-exerting piece into the filter chamber of the filter carrier positioned thereunder and firmly presses the supplied filter aid. To prevent the filter aid and then the liquid to be filtered in the filtering process from escaping sideways, the pressure-exerting plate must be sealed relative to the inner wall of the filter chamber. To implement such a sealing, the known filter carriers are equipped—in the area of the side wall which defines the filter chamber—with annular grooves into which the O-ring seals are inserted. These O-ring seals seal the vertical walls of the pressure-exerting plate.

The distributor element which is held on the bottom side of the pressure-exerting plate is secured there with the aid of circumferentially arranged screws.

It is the object of the present invention to simplify such a construction and to increase wear resistance and functional reliability at the same time, with the high demands made on sterility being also met.

This object is attained in that the seal comprises both a sealing edge for sealing between the pressure-exerting plate and the side wall of the filter carrier positioned thereunder and a sealing collar for sealing and retaining the distribution element on the pressure-exerting plate.

This solution simplifies the construction on the whole because the seal performs three functions, namely sealing between the pressure-exerting plate and the side wall, holding the distributor element, and sealing the distributor element relative to the pressure-exerting plate. Since all of the three functions are fulfilled with the aid of a single component, i.e., a seal, the construction is simplified and the manufacturing costs are reduced to a considerable degree. Moreover, operative reliability is increased because the sealing collar also seals the distributor element.

The seal is lockingly held on the pressure-exerting plate in a very advantageous development of the invention. This arrangement of the seal is easy to implement. Moreover, fastening with screws is not necessary. This eliminates the possibility of the formation of deposits as are found in the prior art, with the deposits being very difficult to remove in the area of the screw connections and being undesired in view of the high demands made on sterility. The filter carriers and the filter towers of the abovementioned type have a circular shape as a rule. The seal is then formed as a surrounding sealing ring.

An impact-resistant and high-strength plastic material has been found to be especially suited as a material for the sealing ring. Such a plastic material is, e.g., the material that is commercially available under the name "Lauramid". This substance is a polyamide produced in a lactam casting process. Such a plastic material exhibits extraordinary dimensional stability and, in particular, a great notch impact strength and high creep resistance. As a result, the seal becomes resistant to wear, and the relatively rigid construction of the sealing edge has also the effect that, when the filter carriers are stacked one upon the another, the sealing edge performs a stripping action along the inner surface of the side wall in a reliable manner.

The sealing edge and the sealing collar are advantageously biased. This means that the arrangement of sealing collar and sealing edge in the installed state exerts a specific pressure on the inner surface of the side wall on the one hand and the distributor element on the other hand, which increases both the sealing action and the holding function.

A surrounding locking collar which snaps into a surrounding locking groove formed on the pressure-exerting plate is provided on the sealing ring for locking the sealing ring with the pressure-exerting plate. To mount the seal in an improved manner, the pressure-exerting plate passes from the mounting side to the locking groove into an inclined stop portion, so that when being arranged the seal is expanded in the area of the locking collar to the outside until the locking collar can snap into the locking groove inwardly.

The connection may be such that the sealing ring is captively held on the pressure-exerting plate and can only be removed by destruction. It would also be possible to make the sealing ring replaceable.

To achieve uniform inflow of the liquid to be filtered from the side, passage openings are circumferentially formed in the sealing ring for the liquid to be filtered. At a diameter of, e.g., 70 cm, it is sufficient to supply the liquid to be filtered with the aid of about 5 to 7 circumferentially distributed passage openings. This permits a uniform distribution above the filter chamber of the filter element postioned thereunder.

In another advantageous embodiment of the invention, a receiving groove for a surrounding outer seal is provided on the bottom opposite to the seal. The upper end of the side wall is thus received by two, approximately opposite sealing surfaces of the filter element positioned thereabove, and is reliably sealed against the exit of filter aid and/or liquid to be filtered.

In another embodiment of the invention, the upper edge of the side wall is formed with a beveled portion at least at the filter chamber side for centering the sealing ring. This permits an automatic centering operation during stacking after an initial coarse alignment of sealing rings relative to the filter chamber positioned thereunder whenever an upper filter carrier is inserted with the pressure-exerting plate into the upper portion of the filter chamber of the filter carrier positioned thereunder.

In another advantageous embodiment of the invention, the sealing edge is arranged on the seal opposite to the sealing collar. The forces applied to the sealing collar and the sealing edge thereby compensate each other in part at the point of impact between sealing edge and sealing collar, which further increases the stiffness and thus the reliability of the seal.

BRIEF DESCRIPTION OF THE DRAWINGS

The invention shall now be explained and described in more detail with reference to an embodiment shown in the drawing, in which:

FIG. 3 is a sectional view of two filter carriers constructed according to the invention in their assembled state; and FIG. 4 is a partly perspective sectional view of a seal as is used in the invention.

DETAILED DESCRIPTION OF THE PREFERRED EMBODIMENTS

Figure 1:
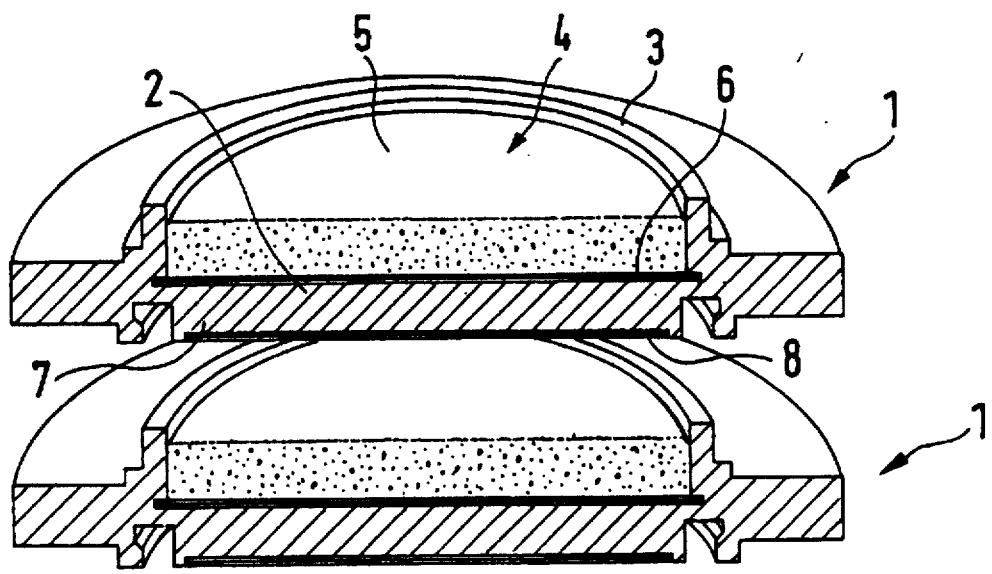
FIG. 1 is a diagrammatic, partly perspective basic view of two filter carriers.
Figure 2:
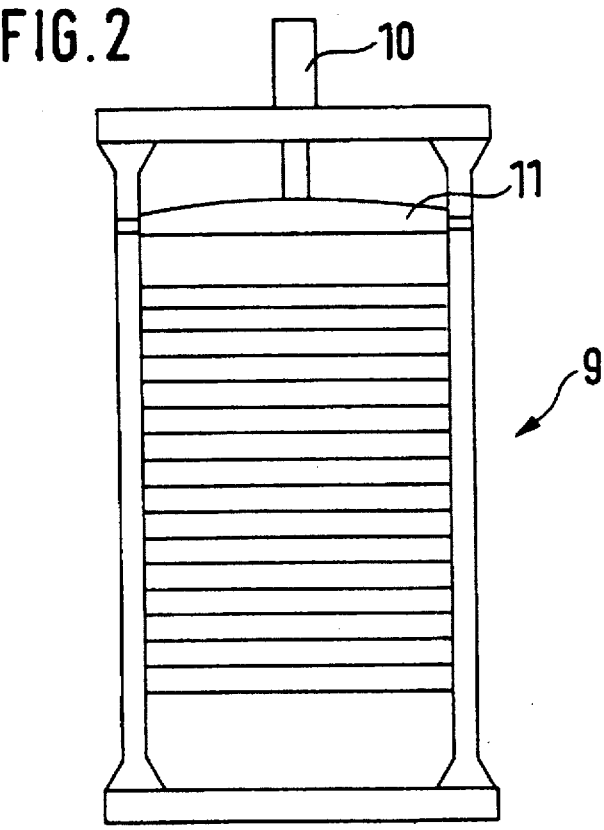
FIG. 2 is a lateral, predominantly diagrammatic view of a filter tower which can be obtained by assembling the filter carriers.

To explain the basic construction, reference is first of all made to FIGS. 1 and 2 which, although they do not illustrate the design according to the invention, show how filter carriers must in principle be designed for the assembly of a filter tower.

FIG. 1 is a sectional view of two superposed filter carriers 1. Filter carrier 1 has a circular shape and includes a bottom 2, a surrounding side wall 3 and a filter chamber 4 into which the filter cake 5 is supplied in known manner for precoating (WO 93/00146).

The filter cake is formed above a mesh-type and/or sintered fabric 6 arranged on bottom 2, through which the filtrate can be discharged via outlet channels (not shown in more detail) in the known manner during the filtering operation.

Bottom 2 is followed by a pressure-exerting plate 7 which carries a distributor element 8 at its bottom end. The distributor element 8 may be composed of a plurality of layers of a mesh-type or sintered fabric. The liquid to be filtered is also supplied via channels (not shown in more detail) in a known manner and in the assembled state of the filter tower such that the liquid to be filtered is distributed via the distributor element 8 over the surface of the filter cake 5 of the respective filter carrier 1 positioned thereunder.

As becomes already apparent from FIG. 1, the filter carriers are designed such that they can be stacked up in tower-like configuration, thereby forming a filter tower 9, as is diagrammatically shown in FIG. 2. The pressureexerting plate 7 with the distributor element 8 engages into the filter chamber 4 of the filter element positioned thereunder and compresses the filter cake to the desired degree during compression. The compressing operation in the filter tower is performed with a suitable press plate 11 and a corresponding drive 10.

The inventive design of a filter carrier in cooperation with another filter carrier is shown in detail in FIG. 3.

The figure also illustrates side wall 3, bottom 2 on which the sinter and/or mesh-type fabric 6 is positioned and above which the filter cake is formed, and the area of the pressure-exerting plate 7. The distributor element 8 which is formed of three layers of metallic fabric is positioned below the pressure-exerting plate 7.

A profiled seal 12 is circumferentially arranged on the portion of the pressure-exerting plate 7 that engages into the filter carrier 1 positioned thereunder. The contour of the seal is clearly illustrated in FIG. 4. The seal consists of an impact-proof and high-tenacity plastic material, such as polyamide which is commercially available under the name Lauramid.

The seal has a surrounding locking collar 13 with which it is locked in a surrounding annular groove 14 on the circumference of the pressure-exerting plate 7. Seal 12 also comprises a sealing edge 15 which is formed at the end of the almost rigid, but sufficiently flexible sealing lip 16. In the illustrated position, sealing edge 15 is biased against the inner surface of side wall 3, thereby sealing the bottom portion of a filter carrier positioned thereabove relative to the filter cake and filter chamber, respectively, in a reliable manner. Sealing collar 17 is formed opposite to the sealing edge 15. The sealing collar has two functions. On the one hand, it has a sealing function relative to the distributor element 8. On the other hand, it also holds and presses the surrounding edge of the distributor element against the inclined surface 18 and thus serves to hold the distributor element. The sealing lip 16, including sealing edge 15, and the sealing collar 17 abut against each other at the same point S, which effects a mutual force support.

To secure or mount the seal, the outer wall of the pressure-exerting plate is provided with an inclined stop portion 19 along which the locking collar slides when being slipped on, whereby the locking collar portion is outwardly expanded until the locking collar can snap into the locking groove 14. The seal is then firmly held on the pressure-exerting plate and on the bottom of the filter carrier.

Bores 20 which are in alignment with inlet bores (not shown in more detail) for the liquid to be filtered are formed in the seal such that they are distributed over the circumference thereof. At a diameter of the filter carrier of, e.g., 70 cm, approximately 5 to 10 thin bores are sufficient for the inflow of the liquid to be filtered.

In the area opposite to the sealing edge 15, the bottom is provided with a receiving groove 21 in which a surrounding outer seal 22 is inserted. The side wall 3 of the filter carrier positioned thereunder is thus tightly received between the outer seal 22 and sealing edge 15 and thus sealed relative to the filter carrier positioned thereabove.

When the filter carriers are slid into and pressed against one another in the filter tower, the sealing edge 15 simultaneously acts as a stripping means in that it frees the side wall of possible deposits through its scraping action.

The upper area of the side wall 23 is provided with a beveled portion both on the inner edge and the outer edge, thereby facilitating the insertion of the side wall into the area between sealing edge 15 and outer seal 22.

In the assembled state (as illustrated), the liquid to be filtered is then introduced from the side of a respective filter carrier via corresponding bores and flows through the passage openings 20 into the area of the distributor element 8, so that it is distributed over the filter cake and evenly passes therethrough.

The liquid to be filtered then flows out laterally via the mesh-type fabric 6 into a collection channel (not shown in more detail) and from there to the filtrate outlet.

The seal is arranged on the pressure-exerting plate region without any screw connection just by a snapping action. The distributor element 8 is simulteanously retained with the locking of the seal, resulting, on the whole, in a very simple design and a high sealing effect at the same time.

FIG. 4 once again shows the structure of the seal in detail. The plus signs mean that both the sealing collar and the sealing lip with the sealing edge are formed such that they exert a contact pressure on the respectively opposite abutment surfaces in their installed position.

I claim:

1. In a filter device having a plurality of stackable filter carriers which when stacked form a filter tower, each filter carrier having a bottom wall and side walls substantially defining a filter chamber with a filter means for filtering a liquid which is circulated through said filter chamber and for forming a filter cake thereon, said bottom wall comprising a pressure-exerting plate means for pressing the filter cake in the filter chamber therebelow when said filter carriers are stacked to form said tower, and further having at least one distributor element means positioned below said pressure-exerting plate means for distributing the liquid to be filtered in the filter chamber below said pressure-exerting plate means, wherein the improvement comprises:

a seal for sealing between said pressure-exerting plate and said side walls of said filter carrier positioned thereunder, said seal comprising an integrally formed body having a first end which includes a sealing edge means for sealing between said pressure-exerting plate and said side wall of said filter carrier positioned thereunder and a sealing collar means for sealing and retaining said distributor element on said pressure-exerting plate.

2. The filter device according to claim 1, wherein said seal (12) is lockingly held on said pressure-exerting plate (7).

3. The filter device according to claim 1, wherein said seal (12) is formed as a surrounding sealing ring.

4. The filter device according to claim 3, wherein said sealing ring consists of an impact-resistant and creep-resistant plastic material.

5. The filter device according to claim 1, wherein said sealing edge means (15) and said sealing collar means (17) are elastically deformable.

6. The filter device according to claim 3, wherein said integrally formed body has a second end which includes a surrounding locking collar means (13) for locking said sealing ring (12) with said pressure-exerting plate (7).

7. The filter device according to claim 6, wherein an inclined stop portion (19) is formed on said pressure-exerting plate (7) and is positioned to engage said locking collar means (15).

8. The filter device according to claim 3, 4, 6, or 7, wherein passage openings (20) for the liquid to be filtered are circumferentially formed in said sealing ring (12).

9. The filter device according to claim 1, 2, 3, 4, 5, 6, or 7, wherein a receiving groove (21) for a surrounding outer seal (22) is provided on said bottom wall (2) opposite to said seal (12).

10. The filter device according to claim 3, 4, 6, or 7, wherein the outer edge of said side wall is formed, at least at the filter chamber side, with a beveled portion (24) for centering said sealing ring (12).

11. The filter device according to claim 5, wherein said sealing edge means (15) of said seal (12) is arranged opposite to said sealing collar means.

12. The filter device according to claim 5, or 11, wherein said sealing edge means (15) is formed by a lip ring (16).

* * * * *

UNITED STATES PATENT AND TRADEMARK OFFICE
CERTIFICATE OF CORRECTION

PATENT NO. : 5,453,184
DATED : September 26, 1995
INVENTOR(S) : Thomas Handtmann It is certified that error appears in the above-indentified patent and that said Letters Patent is hereby corrected as shown below:

Claim 7, column 6, line 17, "(15)" should be —(13)—.

Claim 9, column 6, line 23, delete "wall".

Claim 12, column 6, line 32, "5, or 11," should be —5 or 11,—.

Signed and Sealed this

Sixteenth Day of July, 1996

BRUCE LEHMAN

*Attest:*

*Attesting Officer*   *Commissioner of Patents and Trademarks*